(12) United States Patent
Hurme

(10) Patent No.: US 6,341,220 B1  
(45) Date of Patent: Jan. 22, 2002

(54) FINDING COPIED SIM CARDS

(75) Inventor: Jaana Hurme, Tampere (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/180,034

(22) PCT Filed: Mar. 6, 1998

(86) PCT No.: PCT/FI98/00202

§ 371 Date: Oct. 30, 1998

§ 102(e) Date: Oct. 30, 1998

(87) PCT Pub. No.: WO98/41050

PCT Pub. Date: Sep. 17, 1998

(30) Foreign Application Priority Data

Mar. 10, 1997 (FI) .................................. 970993

(51) Int. Cl.[7] .............................................. H04M 1/66
(52) U.S. Cl. ..................... 455/410; 455/433; 455/456; 455/67.1
(58) Field of Search ........................... 455/410, 411, 455/432, 433, 456, 518, 519, 435, 422, 67.1; 380/247, 248, 250, 258, 270; 379/189

(56) References Cited

U.S. PATENT DOCUMENTS

| 5,335,265 A | * | 8/1994 | Cooper et al. .............. 455/410 |
| 5,345,595 A | * | 9/1994 | Johnson et al. ............. 455/410 |
| 5,535,431 A | * | 7/1996 | Grube et al. ................ 455/411 |
| 5,953,652 A | * | 9/1999 | Amin et al. ................. 455/410 |

FOREIGN PATENT DOCUMENTS

| DE | 779757 | 6/1997 |
| WO | WO 96/04759 | 2/1996 |
| WO | WO 96/36194 | 11/1996 |
| WO | WO 97/01253 | 1/1997 |
| WO | WO 97/33445 | 9/1997 |

OTHER PUBLICATIONS

Copy of the International Search Report for PCT/FI98/00202.
Global System for Mobile Communications (GSM), European digital cellular telecommunications system (Phase 2); Specification of the Subscriber Identity Module—Mobile Equipment (SIM—ME) interface (GSM 11.11), p. 1–93, Nov. 1994.
Global System for Mobile Communications (GSM), European digital cellular telecommunications system (Phase 2); Subscriber Identity Modules (SIM)—Functional characteristics (GSM 02.17), p. 1–15, May 1994.

* cited by examiner

Primary Examiner—Lester G. Kincaid
(74) Attorney, Agent, or Firm—Altera Law Group, LLC

(57) ABSTRACT

A method and apparatus implementing the method for detecting copying of an international mobile subscriber identity in a mobile communication network in which the location of mobile stations is updated in at least one register of the network. According to the method, the number of at least one type of location updatings (advantageously inter-MSC) is monitored within a predetermined monitoring period (e.g. 24 hours). This number is compared to a predetermined threshold value, and if the number of location updatings exceeds the predetermined threshold value, a signal indicative of the exceeding will be generated.

14 Claims, 6 Drawing Sheets

FINDING COPIED SIM CARDS

BACKGROUND OF THE INVENTION

The invention relates to a method and apparatus for preventing misuse of a copied subscriber identity in a mobile communication system.

In all telecommunication networks, both the users and the network operator must be protected as well as possible against undesired invasions by third parties. Consequently, there is need in the networks for many types of security functions. The most important features relating to the security of the network are (1) protecting the information conveyed by the network and (2) authenticating the users and controlling their access. The most important safety measure for protecting information in the foreseeable future is some kind of encryption. Authentication is a way by means of which an effort is made to ensure that information originates from the source it is claimed to, originate from. Typically, it is based on passwords and keys. Access rights refer to the ability to transmit and/or receive via a transmission channel. Access mechanisms are based on some kind of a password or key.

As transmission to mobile subscribers takes place by a radio connection, radio connected Public Land Mobile Networks (PLMN) are particularly sensitive to unauthorized users using their resources and eavesdropping on the information exchange on the radio path. This results from the possibility to listen to and to transmit radio signals from anywhere without having to gain access to the equipment of the user or the operator. It can be seen that better standards of security are required in PLMN networks than in conventional communication networks.

The basic structure of the Pan-European digital cellular radio system GSM (Global System for Mobile Communications) is illustrated by FIG. 1. The structure of the GSM network consists of two parts: a Base Station Subsystem (BSS) and a Network Subsystem (NSS). The BSS and mobile stations MS communicate by radio connections. In the BSS, every cell is served by a Base Transceiver Station (BTS). A group of base stations BTS are connected to a Base Station Controller (BSC) whose function is to control the radio frequencies and channels used by the BTS. The base station controllers BSC are connected to a Mobile Switching Center (MSC). The function of the MSC is to switch calls that involve at least one MS. Some MSCs are coupled to other communication networks, such as a Public Integrated Services Network (PISN), and they comprise switching functions for processing calls to and from these networks. Such mobile switching centers are referred to with the term Gateway MSC (GMSC).

Routing of calls involves two types of databases. In a Home Location Register (HLR) are stored, permanently or semi-permanently, subscriber data of all the subscribers of the network, such data containing information on all the services the subscriber is entitled to, and the subscriber's present location. The second register type is a Visitor Location Register (VLR). The VLR is usually connected to one MSC, but it may also serve a plurality of them. The VLR is commonly integrated in the MSC. Such an integrated network element is referred to as a VMSC (VLR+MSC). When the MS is active (it has registered in the network, and may make or receive a call), the majority of the subscriber data concerning the MS included in the HLR is loaded (copied) into the VLR of the MSC in whose service area the MS is located.

The GSM system comprises a most secure authentication system. This also holds true of the derivatives of the GSM system, such as the DCS. The authentication system is based on a so-called challenge and response principle. Upon drawing up a subscriber contract, a secret subscriber authentication key (Ki) and an International Mobile Subscriber Identity (IMSI) are assigned to the subscriber. The Ki is stored in a network element serving this purpose in the GSM network, referred to as an Authentication Center (AUC), which is associated with or connected to the subscriber's HLR. The AUC also contains a ciphering algorithm known as A8, an authentication algorithm known as A3, and a generator of random numbers RAND. On the basis of Ki and RAND, a ciphering key Kc is produced by the algorithm A8. Similarly on the basis of Ki and RAND, a Signed Response (SRES) is produced by applying the A3 algorithm. These three parameters, RAND, Kc and SRES form a triplet which is characteristic to the subscriber and which will be employed in later authentication and ciphering.

Referring to FIG. 2, the AUC comprises a database 20 to which the authentication key Ki of each subscriber in the GSM network is stored. A subscriber's Ki may be retrieved from the database 20 by using the IMSI as an index.

To avoid computing and transmitting the triplet every time it is needed, the AUC/HLR computes several triplets for each subscriber in advance, and if required supplies them to the VLR to which they are stored. The MSC/VLR has at all times an unused triplet at its disposal for each visiting subscriber. The high level of security sets the condition that a triplet is used once only, for one connection, after which it is destroyed.

FIG. 4 illustrates a few of such subscriber-specific triplets. A security parameter file 40 comprises n triplets for each 1-n IMSIs. Such a reserve in the security parameter file 40 is established when a subscriber for the first time registers in a visited MSC and a VLR. It is part of the subscriber data that were loaded from the HLR in connection with an INSERT SUBSCRIBER DATA message.

Referring to FIG. 5, when a subscriber has used all the triplets at his disposal, a request is made to the AUC/HLR to compute and send back a new series. The supplementing procedure of the triplets consists of two messages: SEND PARAMETERS and a response thereto SEND PARAMETERS RESULT. The former contains the mobile subscriber's IMSI which is used to retrieve the Ki for computing the triplets, as disclosed in connection with FIG. 2. The triplets computed are sent to the MSC/VLR in the SEND PARAMETERS RESULT message and they are stored in the VLR.

Referring again to FIG. 4, the MS transmits an access request to the MSC/VLR. The MSC/VLR retrieves a triplet assigned to the MS from the security parameter file 40 by using the IMSI as an index. On the one hand the MSC/VLR conveys the Kc value to the BSC's channel equipment to be used in traffic channel coding, and on the second hand it conveys the RAND value to the MS in an AUTHENTICATION REQUEST message. This is illustrated by block 41 in FIG. 4. On the basis of RAND, the MS computes the other values of the triplet (SRES and Kc).

Now referring to FIG. 3, the mobile station comprises in its memory a copy of the mobile subscriber's authentication key Ki, as well as the encryption algorithm A8 and the authentication algorithm A3. Upon receiving an AUTHENTICATION REQUEST message, the mobile station MS extracts the RAND from the message and feeds it and the stored Ki to the algorithms A3 and A8, respectively, to compute a signed SRES and the encryption key Kc. The computed SRES is conveyed to the MSC/VLR in an AUTHENTICATION RESULT message to complete the authentication, as illustrated in FIGS. 4 and 5.

Referring to FIG. 4, the MSC/VLR extracts the value of the SRES from the AUTHENTICATION RESULT message (block 42) and retrieves the stored value of the SRES from the file 40 (block 43). Following this, for this connection and prior to other processing, the MSC/VLR authenticates the mobile subscriber by checking that the SRES computed in the AUC/HLR is identical with the SRES (block 44) computed in the mobile station. If the two values are identical, access is allowed. If not, access is denied (block 46).

In the exemplary GSM system, the authentication of the mobile subscriber requires an identity unit, which is subscriber-specific. The terminal equipment proper is therefore not confined to a specific subscriber. The subscriber identity module, such as a SIM card, is a functional card or a smart card which is placed in the mobile station and which contains information, e.g. an authentication key Ki, required for identifying a subscriber and for encrypting radio traffic. In the present application, a subscriber identity module, such as a SIM card, refers to a functional card that can be removed from a mobile station and by means of which a subscriber is able to use a card controlled mobile station.

Consequently, if a subscriber identity module, such as a SIM card (Subscriber Identity Module) is in use, the user need not have a mobile station of his own, but a subscriber identity module issued to him by the operator of the mobile communication system is all he needs. Such a subscriber identity module can be, for example, a SIM card which is, in a way, a phone card by means of which the subscriber can make and receive calls from any mobile station of the system. On the one hand, it is the function of the SIM card to provide data that identifies the user safely secured for use by the mobile station, and on the other hand to provide services to the mobile station. The services include maintaining (entering, changing) the personal identification number, maintaining the data encryption key, i.e. the authentication key Ki, and unblocking a SIM card in case its use has been blocked as a result of too many attempts of entering a wrong PIN (Personal Identification Number). Unblocking of a blocked SIM card takes place e.g. by a PUK code (Personal Unblocking Key).

As an alternative way of implementing a SIM card in hand-held phones, a so-called plug-in-SIM has been introduced. A plug-in-SIM is a coin-sized part containing the electronics of a credit-card-sized SIM card, and it is placed in a phone so that the user is not able to replace it with ease. The phone may also have an incorporated plug-in-SIM and, in addition, a card reader. If the card reader contains a card, the phone is identified on the basis of the external card, otherwise on the basis of the incorporated plug-in-SIM.

In the sense of the present application, a mobile station (MS) thus consists of the following two parts: a Mobile Equipment (ME) and the Subscriber identity Module (SIM). The SIM card is specified in the GSM recommendation 02.17. The recommendation 11.11 defines in closer detail the issues specified in the recommendation 02.17 by determining e.g. the protocols between the SIM and the ME, the exact contents and length of the data fields in the SIM, and issues relating to the electronic and mechanical interface. An example of a data field contained by a SIM card is represented by IMSI (International Mobile Subscriber Identity), which identifies the mobile subscriber. Similarly within the scope of the present application, the concept SIM generally refers to a subscriber identity module, such as a SIM card, the small plug-in-SIM, the credit card sized functional SIM smart card, and the MS incorporated subscriber identity module containing the subscriber identity and the authentication key Ki, unless the context gives reason to some other interpretation.

According to GSM recommendations 02.17 and 11.11, three algorithms are used: A3, A5, and A8. The algorithm A3 is used for authentication, A8 for generating the encryption key and A5 for encryption. The algorithms A3 and A8 have been stored both in the SIM card and in the authentication center AUC. The algorithm A5 has been stored both in the ME of the mobile station and the base station BTS. In addition, e.g. the following information is stored in the AUC: the IMSI, the authentication key Ki and information on the version of the algorithm used. The same information is also stored in the mobile subscriber's SIM card.

A problem in the prior art mobile communication system described above is encountered e.g. when the SIM card or information contained by it fall into the hands of a dishonest person. This may result from e.g. misplacement or stealing of the entire phone, or only the SIM card being stolen from the phone, whose information is copied to another SIM card. The system consequently comprises two SIM cards with identical information, i.e. the original card and a copy thereof. Any use of the copied card is harmful to the mobile subscriber having the original card, regardless of whether the misuse is plentiful or slight. In case the misuse is plentiful, it may result in high costs before the subscriber detects the problem in his next phone bill. On the other hand, if the misuse is slight the problem may not be detected for a long time. Within the scope of the present application, using a copied SIM card refers to any technique of deceitfully using the information in the SIM card of another mobile subscriber.

BRIEF DESCRIPTION OF THE INVENTION

It is consequently the object of the present invention to develop a method and an apparatus implementing the method for solving the aforementioned problems related to misuse of a SIM card or information therein. The objects of the invention are achieved with methods and systems that are characterized by that which is disclosed in the independent claims. The preferred embodiments of the invention are set forth in the independent claims.

The invention is based on the view that the copied and original SIM cards cannot always roam in the same location areas in the mobile communication network. At least sometimes situations are bound to occur during which the copied and original SIM cards are within service areas of different mobile switching centers. Such a situation results in a location updating to the home location register. The existence and location area of a copied SIM card may then be detected on the basis of unexpectedly high activity of location updating between switching centers. Such a situation may be detected e.g. by maintaining an event counter in the mobile communication network, which counts location updatings carried out within a monitoring period. When the number of location updatings within the monitoring period exceeds a preset threshold value, a signal is produced that indicates a possible misuse.

The invention improves the security of the mobile communication system against misuse. The invention may be applied to a small, restricted clearly defined area in the software of the mobile switching center and/or the home location register. No modifications are required in the subscriber equipments or other parts of the network architecture.

BRIEF DESCRIPTION OF THE DRAWINGS

In the following, a more detailed description of the invention will be offered in association with the preferred embodiments and with reference to the following drawings, in which.

DETAILED DESCRIPTION OF THE INVENTION

Figure 1:
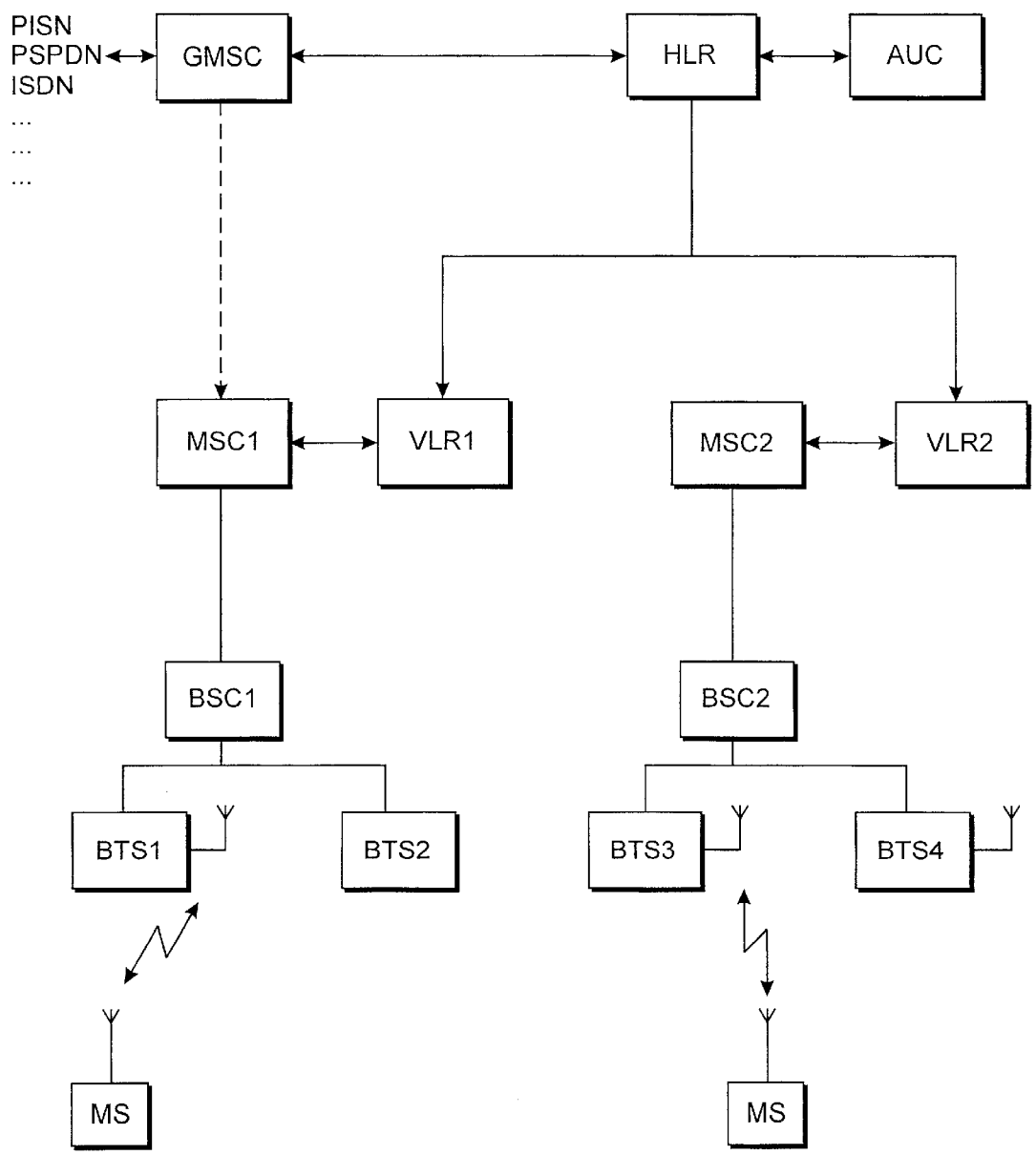
FIG. 1 illustrates the parts of a mobile communication network that are essential from the point of view of the invention.
Figure 2:
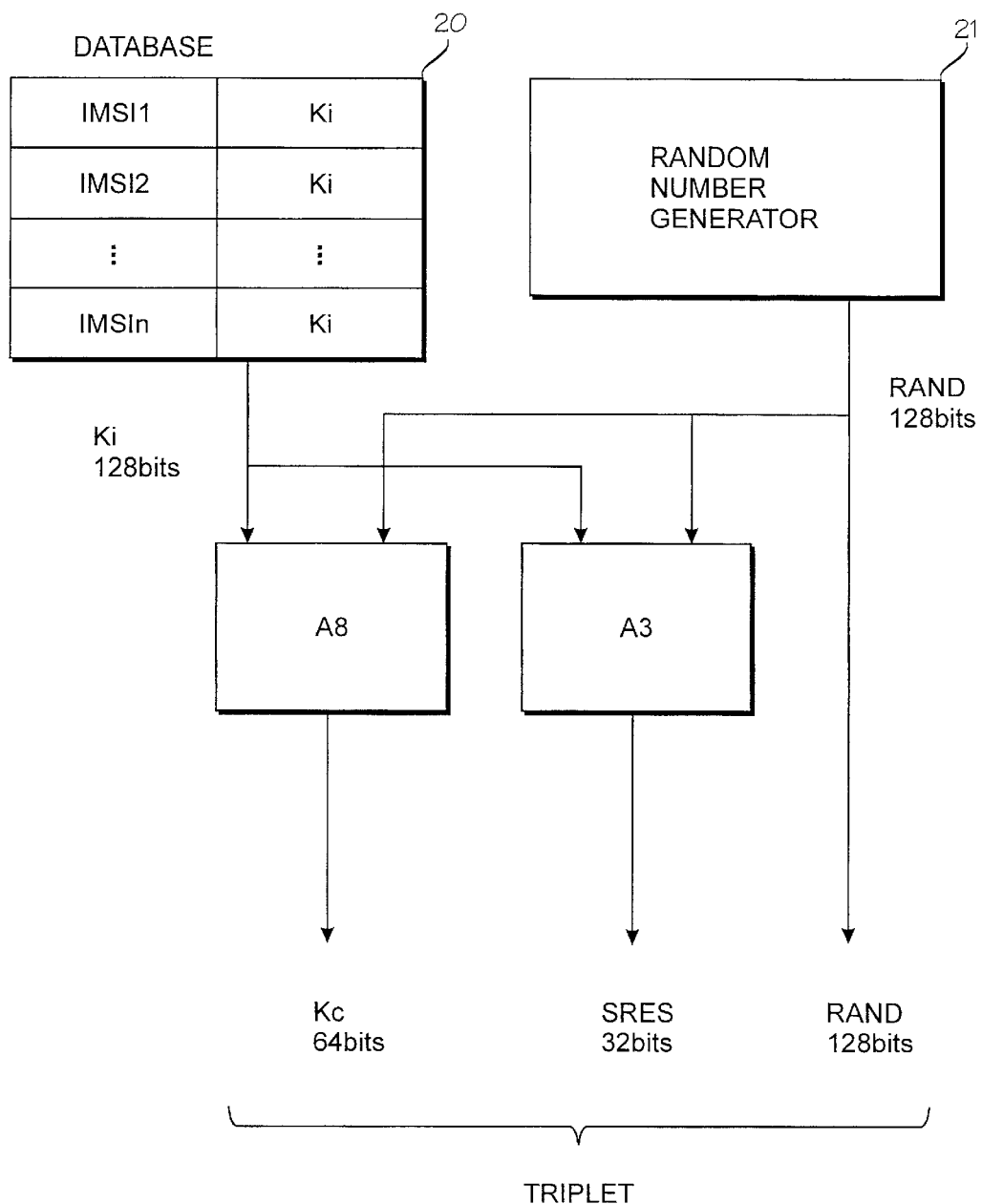
FIGS. 2–5 illustrate identification of a subscriber in a prior art GSM system.
Figure 3:
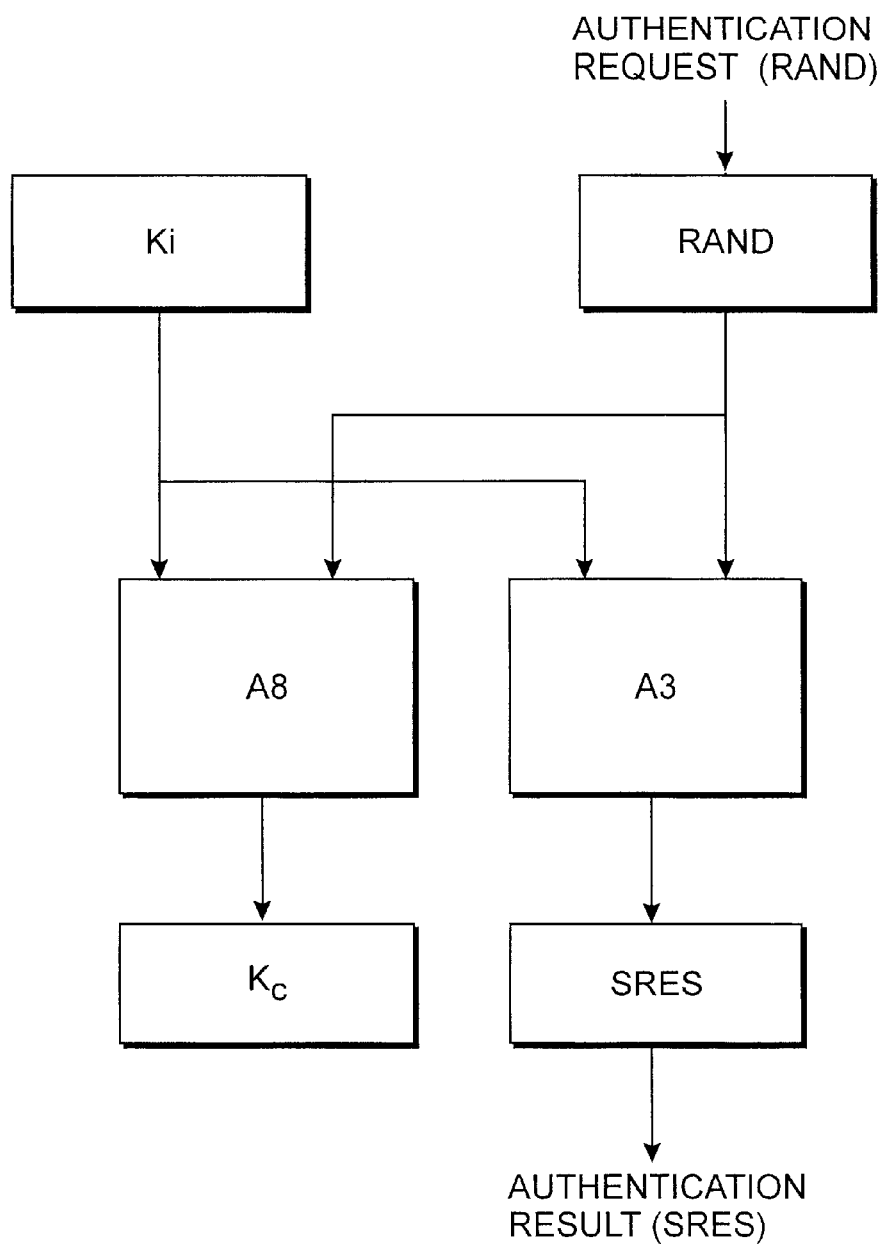
Figure 4:
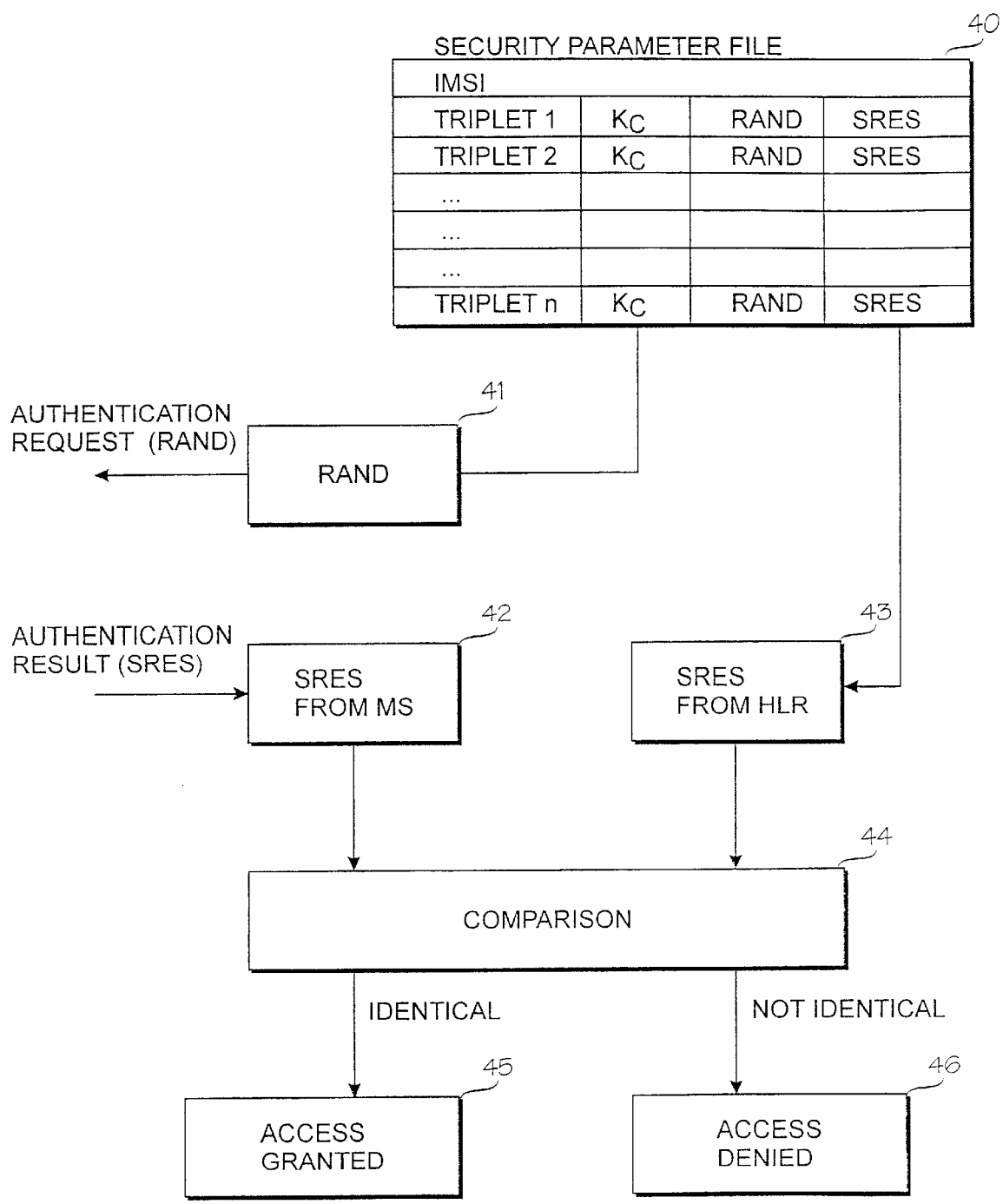
Figure 5:
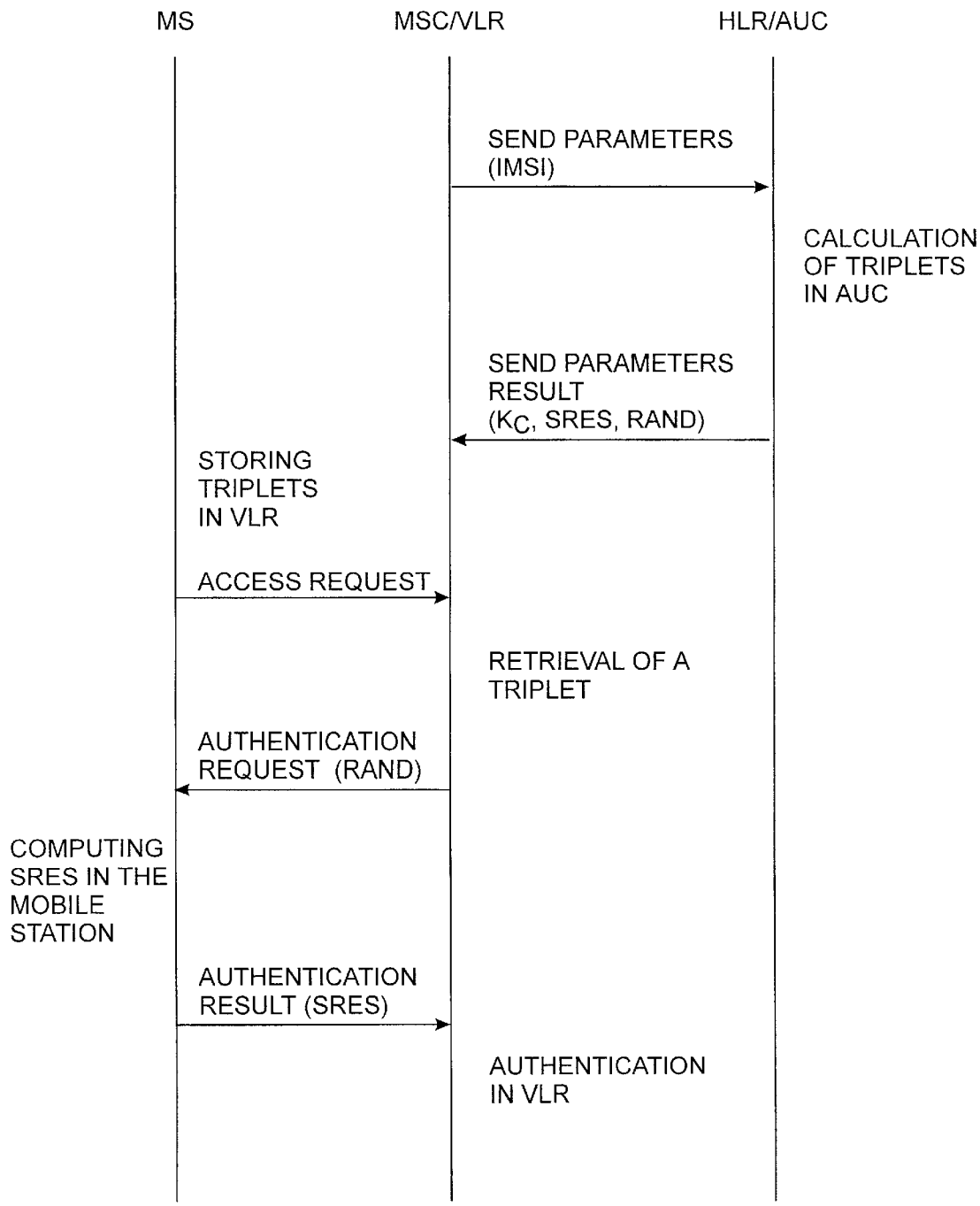

The telephone network operator is able to determine the number of location updatings per time unit in a simple manner by e.g. setting up an event file having a record for each subscriber being monitored for storing the number of location updatings. Alternatively, an existing subscriber file in the system may be supplemented with an extra field in which the number of location updatings being monitored is maintained. At its simplest, the invention operates so that at the beginning of the monitoring the number field of the subscriber's event record is set to zero and it is incremented at each location updating. The contents of the number field in the event record (number N of the location updatings being monitored) are read at least at the end of the monitoring period (e.g. after 24 hours) and they are compared to a predetermined threshold value $N_{MAX}$. Exceeding the threshold value generates a signal on the basis of which the operator may place a subscriber under special supervision in which it is possible to follow the location updatings more closely (e.g. to store in a memory the dates and times, base stations etc. related to the location updatings). The threshold value may be set to for example 10 location updatings within 24 hours. The number of location updatings may also be monitored during the monitoring period, for example at the very moment of a location updating.

In the way described above, the invention is relatively simple to implement. A person skilled in the art may discover several alternative ways to implement the invention. To take an example, it is not strictly necessary that the updatings being monitored occur between switching centers. In order to reveal copied subscriber identities any location updating will suffice that takes place between two base stations that are geographically a long distance apart.

Here, the concept "geographically a long distance apart" means e.g. some tens of kilometers. If a location updating with the same subscriber identity is carried out several times within 24 hours in places that are tens of kilometers apart there is reason to suspect copying of the subscriber identity. By restricting the monitoring to inter-MSC updatings, a noteworthy advantage will be gained, because it is exactly in such an incident that the location of the subscriber is updated to the network home location register, and the functionality of the invention is simplest to implement in connection with an inter-MSC location updating.

The invention is partly based on the notion that revealing of copied subscriber identities does not require a particularly complicated algorithm. In the case of the exemplary GSM system, copying of subscriber identities is in any case complicated enough to prevent acquisition of the equipment and knowledge in order to copy just one or a few subscriber identities: if unauthorized copying takes place, the operation is probably widespread. Unauthorized copying is already hindered in advance by the knowledge that the mobile communication networks may even afterwards be provided with a functionality according to the invention, in which, practically speaking, a user of a copied subscriber identity will without a doubt be revealed sooner or later.

According to yet another alternative embodiment, monitoring the location updating activity in the mobile communication network is not directed continuously to all the subscribers; instead, a suitable subgroup of subscribers may be selected to be monitored at a time, for example IMSI numbers within a specific range. This embodiment provides the advantage of reduced requirements for memory resources.

Implemented according to the simple embodiment described above, the invention may cause false alarms e.g. in a situation in which a mobile station roams repeatedly in service areas of different mobile switching centers. Such a situation may result from a mobile station being used by the driver of a public transportation vehicle (particularly if the same mobile station is in use jointly by all the work shifts). False alarms may be prevented e.g. by storing, in the subscriber record, also subscriber-specifically such a number of location updatings within a monitoring period for which an alarm is activated. Alternatively, the subscribers may be divided into at least two categories (such as corporate users and private users), of which one category is used for such special subscribers, with the threshold value leading to an alarm being higher in this category than for normal subscribers.

An alternative approach may be to determine for such special subscribers a category or a subscriber-specific condition in which the monitoring scheme according to the invention is not in use. The same outcome is achieved by maintaining a separate exception file (not shown) into which such subscriber identities are stored that are not being monitored. However, if monitoring is completely off for some subscribers, the threat emerges that the subscriber identities of such subscribers become particularly tempting targets of false play.

It might be feasible, as an alternative embodiment, to make the threshold value—i.e. the number of location updatings within a monitoring period that leads to an alarm—adaptive. This may be accomplished e.g. by forming the threshold value from the mean number of location updatings by the same subscriber and adding thereto a suitable margin of certainty, e.g. 50–100%. If the frequency of location updatings changes significantly, there is reason to suspect copying of the subscriber identity. This embodiment provides the advantage that it is easy to reveal changes in the activity of location updatings for each individual subscriber identity.

Figure 6:
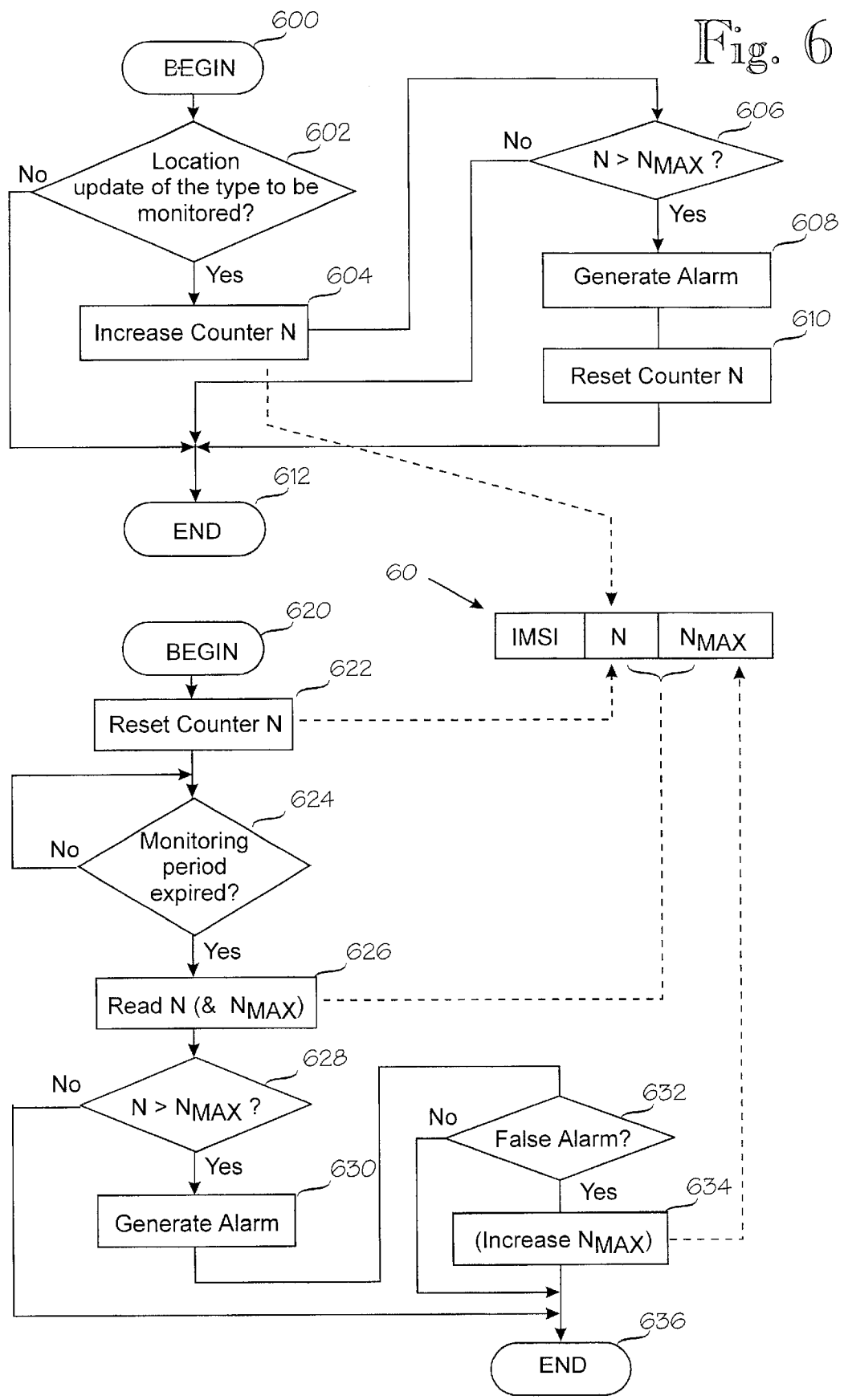
FIG. 6 is a flow chart illustrating the technique according to the present invention.

FIG. 6 is a flow chart representation of how the procedures described above may be combined. Reference number 60 denotes an inventive event record which comprises an event counter N and possibly the maximum number $N_{MAX}$ of the events. The event records 60 may be stored in a separate event file or they may constitute a part of an existing subscriber record. This information may be maintained on the basis of the IMSI directly in the MSC or the HLR of the network. FIG. 6 only shows one event record. Naturally, there exists a dedicated record for each subscriber being monitored.

Steps 600–602 illustrate how the monitoring of the location updatings according to the invention may be incorporated in the mobile communication system into the software maintaining the location of the MS, most advantageously in the MSC. At step 602, it is examined whether the location updating belongs to the type whose total number is being monitored. As noted in the above, a particularly well suited type of monitoring location updatings is inter-MSC location updating because information on such an updating is in any case transferred to the HLR of the subscribers home network. In case steps 600–602 are incorporated in the MSC into the software carrying out inter-MSC location updating, the separate step 602 is not required. At step 604, the value of the event counter N is incremented, and at step 606 it is compared to the predetermined threshold value $N_{MAX}$. If the threshold value is exceeded, an alarm is generated at step 608, and at step 610 the counter N is set to zero for the succeeding monitoring period. The step 608 producing an alarm may be supplemented in the way described below in connection with steps 632–634. At step 612, the process maintaining location updating continues as in prior art.

Steps 620–636 illustrate a way by means of which monitoring location updatings according to the invention may be implemented at predetermined times. The process is begun at the beginning of the monitoring period at step 620. At step 622, the event counter N is set to zero for all the subscribers. Step 624 of the flow chart illustrates a test which checks whether the monitoring period (e.g. 24 hours) has elapsed. In reality, a separate test is not necessarily required at all, as test 624 may be carried out implicitly by adding steps after it to the software which in a center or the like is in any case carried out at predetermined intervals, e.g. at midnight. At step 626 the event counter N is read (most suitably on the basis of IMSI). Also the maximum number $N_{MAX}$ of events is determined. In the example of FIG. 6, the maximum number $N_{MAX}$ is determined by reading it subscriber-specifically from the same record 60 as the event counter N. As set forth above, the maximum number $N_{MAX}$ may also be fixed or category-specific. At step 628, the value of the event counter N is compared to the allowed maximum number $N_{MAX}$. If the value of the event counter N exceeds the maximum number $N_{MAX}$, an alarm is generated at step 630. At step 632 it is examined whether a false alarm is in question, i.e. whether an honest subscribers mobile station performs several location updatings monitored within 24 hours. If such a false alarm is in question, the value of the maximum number $N_{MAX}$ may be increased e.g. subscriber-specifically. Alternatively, the IMSI in question may be stored in an exception file (not shown) which stores subscriber identities that do not generate an alarm.

The method according to the invention described in connection with FIG. 6 may be implemented with relatively simple changes in the software and/or hardware if compared to the prior art mobile communication system. If inter-MSC location updatings are monitored, it is possible to utilize signals that are in any case conveyed to the MSC. In such a case, all the modifications required to implement the invention may be limited to the software and databases of the MSC/HLR. In addition, only the alarms are signalled to outside of the center (for example to the billing center, which is not shown in the figures). The event counter N shown by FIG. 6 may be implemented e.g. so that the subscriber data maintained at the HLR is supplemented by incorporating an event counter N thereto, and possibly also a subscriber category of a subscriber-specific maximum number $N_{MAX}$ for the events.

A person skilled in the art will find it obvious that, with advancements in technology, the basic idea of the invention may be implemented in many different ways. The invention has been described by way of example in connection with the GSM system and its derivatives, but it is applicable to other mobile communication systems which have a mechanism incorporated therein to control the subscribers' location and location updatings. The invention and its embodiments are not restricted to the examples above, but they may vary within the scope of the claims.

What is claimed is:

1. A method for detecting copying of a subscriber identity (IMSI) in a mobile communication network in which the location of mobile stations (MS) is updated in at least one register (HLR, VLR) of the network, comprising:

monitoring, for at least some of the mobile stations (MS), the number (N) of location updatings of at least one type during a predetermined monitoring period;

comparing said number of location updatings to a predetermined threshold value ($N_{MAX}$);

maintaining a group of special subscribers; and in response to said number (N) of location updatings exceeding the predetermined threshold value ($N_{MAX}$), generating a signal indicative of exceeding said predetermined threshold value ($N_{MAX}$) only when a subscriber is not one of said special subscribers.

2. A method as claimed in claim 1, wherein the type of location updatings being monitored comprises an inter-MSC location updating.

3. A method as claimed in claim 2, wherein the type of location updatings being monitored comprises a location updating between such base stations (BTS) that are at least some tens of kilometers apart.

4. A method as claimed in claim 3, comprising:

classifying the subscribers into at least two categories; and setting a different threshold value for each category.

5. A method as claimed in claim 3, wherein said threshold value ($N_{MAX}$) is subscriber-specific and depends on the previous frequency of location updatings by the same subscriber.

6. A method as claimed in claim 2, comprising:

classifying the subscribers into at least two categories; and setting a different threshold value for each category.

7. A method as claimed in claim 2, wherein said threshold value ($N_{MAX}$) is subscriber-specific and depends on the previous frequency of location updatings by the same subscriber.

8. A method as claimed in claim 1, wherein the type of location updatings being monitored comprises a location updating between base stations (BTS) that are at least some tens of kilometers apart.

9. A method as claimed in claim 8, comprising:

classifying the subscribers into at least two categories; and setting a different threshold value for each category.

10. A method as claimed in claim 8, wherein said threshold value ($N_{MAX}$) is subscriber-specific and depends on the previous frequency of location updatings by the same subscriber.

11. A method as claimed in claim 1, comprising:

classifying the subscribers into at least two categories: and setting a different threshold value for each category.

12. A method as claimed in claim 1, wherein said threshold value ($N_{MAX}$) is subscriber-specific and depends on the previous frequency of location updatings by the same subscriber.

13. A network element of a mobile communication network, to which the means (HLR, VLR) are functionally coupled to handle the location updatings of a subscriber, wherein the network element (MSC) further comprises:

means (60) for monitoring, subscriber-specifically, the number (N) of at least one type of location updatings during a predetermined monitoring period;

means (628) for comparing said number (N) to a predetermined threshold value ($N_{MAX}$);

means for maintaining a group of special subscribers; and means (630) for generating a signal indicative of said number (N) of location updatings exceeding the predetermined threshold value ($N_{MAX}$) in response to said number (N) of location updatings exceeding the predetermined threshold value ($N_{MAX}$) only when a subscriber is not one of said special subscribers.

14. A network element as claimed in claim 10, wherein said network element is a mobile switching center.

\* \* \* \* \*